United States Patent
Kuntz et al.

(10) Patent No.: US 7,041,233 B2
(45) Date of Patent: May 9, 2006

(54) METHOD OF GENERATING A 3-DIMENSIONAL EFFECT

(75) Inventors: Matthias Kuntz, Seeheim-Jugenheim (DE); Rodney Riddle, Poole (GB); John Patrick, Poole (GB); Robert Hammond-Smith, Dammerham (GB)

(73) Assignee: Merck Patent GmbH, Darmstadt (DE)

( * ) Notice: Subject to any disclaimer, the term of this patent is extended or adjusted under 35 U.S.C. 154(b) by 16 days.

(21) Appl. No.: 10/615,376

(22) Filed: Jul. 9, 2003

(65) Prior Publication Data

US 2004/0058132 A1    Mar. 25, 2004

(30) Foreign Application Priority Data

Jul. 9, 2002    (EP)    .................................. 02015207

(51) Int. Cl.
*C09K 19/52*    (2006.01)
(52) U.S. Cl. .................. 252/299.01; 428/1.1; 349/194
(58) Field of Classification Search .................. 349/84, 349/96, 97, 98, 194; 428/1.1; 252/299.01
See application file for complete search history.

(56) References Cited

U.S. PATENT DOCUMENTS

| | | | | |
|---|---|---|---|---|
| 5,264,964 A | * | 11/1993 | Faris | .......................... 359/465 |
| 5,381,253 A | * | 1/1995 | Sharp et al. | ................... 349/18 |
| 5,398,131 A | | 3/1995 | Hall et al. | |
| 5,457,554 A | * | 10/1995 | Faris | ........................... 349/13 |
| 5,552,912 A | * | 9/1996 | Sharp et al. | ................ 349/117 |
| 6,319,963 B1 | | 11/2001 | Coates et al. | |
| 6,753,044 B1 | * | 6/2004 | Faris et al. | ................... 428/1.1 |

OTHER PUBLICATIONS

Partial European Search Report from EP Application No. 03 01 3342 completed Jun. 15, 2005.
F. Moia, et al., "Optical LPP/LCP Devices: A New Generation of Optical Security Elements", Proceedings of the SPIE vol., 3973 (2000), XP-008003043 ISSN: 0277-786X.
M. Schadt et al., "Photo-Induced Alignment and Patterning of Hybrid Liquid Crystalline Polymer Films on Single Substrates", Japanese Journal of Applied Physics, vol., 34, No. 6B, (1995), pp. L764-L767.

* cited by examiner

*Primary Examiner*—Mark F. Huff
*Assistant Examiner*—Jennifer R. Sadula
(74) *Attorney, Agent, or Firm*—Millen, White, Zelano, Branigan, P.C.

(57) ABSTRACT

A method for generating a 3-dimensional effect involves providing at least one first image layer of a chiral liquid crystal material, and at least one second image layer of a chiral liquid crystal material, wherein one of the first and second image layers reflects right-handed circularly polarised light and the other reflects left-handed circularly polarised light, is suitable creating a 3-dimensional image that can be used for decorative and security applications.

25 Claims, 1 Drawing Sheet

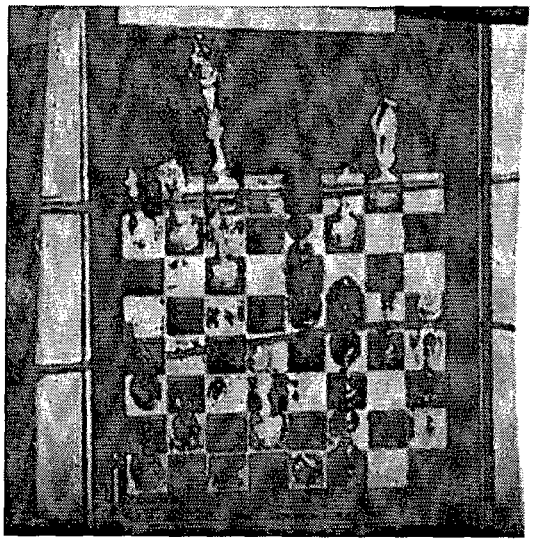
Figure 1
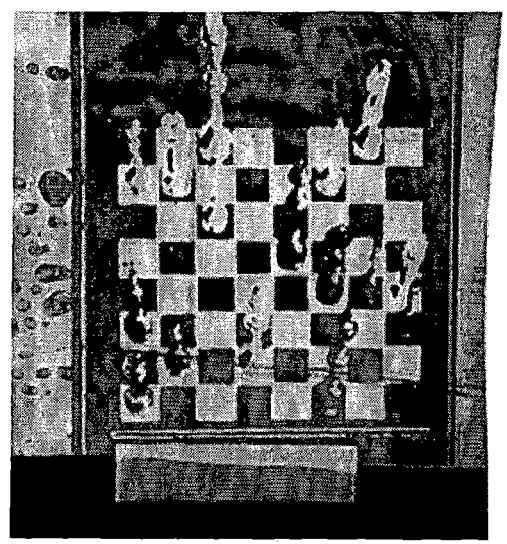
Figure 2
MERCK
Figure 3

METHOD OF GENERATING A 3-DIMENSIONAL EFFECT

FIELD OF THE INVENTION

The invention relates to a method for generating a 3-dimensional effect, to a 3-dimensional image produced by said method, their use for decorative and security applications and to security markings and documents of value comprising such a 3-dimensional image.

BACKGROUND AND PRIOR ART

The generation of 3-dimensional effects based upon the projection of two different perspective images being viewed in the left and right eyes is known in prior art. Typically two images of the same object are prepared with a small change in the visual perspective of the image. These images are then viewed in such a manner that each eye of the observer only sees one of the images. The visual process then interprets the two separate images as a single 3-dimensional image. This can be achieved in a variety of manners.

Steroscopic viewers require the use of two distinct images which are viewed through two distinct optical paths.

Composite images can be prepared by superimposing the two separate images using two different coloured inks, e.g. red and blue. When viewed through a device containing suitable red and blue filters each eye only sees one of the component images and reconstructs the 3-D image.

The two images can be projected onto a screen using polarised (linear or circular) light. Again, suitable viewing devices enable the viewer to reconstruct the 3-D image. Many devices are described as LCD shutter devices. These use liquid crystalline materials to provide a filter to each eye. The device is electronically controlled so that the shutters are activated sequentially. This allows the viewer to see first one image through the left eye and later the other image through the right eye.

The idea of using cholesteric liquid crystal (CLC) based pigments to generate these effects is described in WO 99/02340. The pigments described have a changing helical pitch which makes them reflective in a wide range of wavelengths. They comprise a bilayer of polymerized CLC material, wherein each layer exhibits a non-linear pitch distribution throughout its thickness direction and as a result shows reflection of a broad wavelength band with asymmetrical reflection characteristics. The pitch gradient is achieved by mixing together a polymerizable CLC material and a non-polymerizable nematic LC material, coating the mixture onto a substrate, annealing to achieve planar alignment and curing e.g. by UV irradiation. Upon curing phase segregation of the non-polymerizable nematic LC material and the polymerized CLC material occurs. This leads to a pitch distribution including regions with high pitch and regions with low pitch within the material. The bilayer is then prepared by laminating together two similar single CLC layers with non-linear pitch distribution and asymmetrical reflection characteristics in such a manner that the resulting bilayer has symmetrical reflection characteristics. The pigments can be prepared in both right and left handed forms which means that they reflect right or left handed circularly polarised light respectively. Also described is a system whereby the composite image is viewed through a filtering device manufactured from similar broad band cholesteric liquid crystal materials.

WO 96/10208 describes the generation of images utilising CLC materials by interlacing two images in an array form on a polarisation encoded medium.

U.S. Pat. No. 5,692,226 discloses a technique for securing motion pictures by generating two images of differing polarisation using CLCs.

U.S. Pat. No. 5,457,554 describes a 3D-image comprising two images of left- and right-handed CLC inks comprising solid CLC platelets or flakes.

U.S. Pat. No. 5,398,131 relates to a stereoscopic image with left- and right-handed-LC inks, which may comprise, e.g., encapsulated CLC materials. Further described are inks comprising crosslinkable CLC silicones that are oriented at high temperatures of 60–90° C. and made into solid films by thermal curing or photocuring.

However, the methods described in prior art have several drawbacks. The CLC pigments and flakes described in WO 99/02340 and U.S. Pat. No. 5,457,554 require a complicated production process. The methods and apparatus described in WO 96/10208 and U.S. Pat. No. 5,692,226 require complicated arrangements of optical components and multiplexing or patterning techniques. The method described in U.S. Pat. No. 5,398,131 requires the CLC inks to be mixed or superimposed to form a stereo pair of images and, where curable materials are involved, requires high processing temperatures.

SUMMARY OF THE INVENTION

An aim of the present invention is to provide new methods for generating 3-dimensional effects and images that do not have the drawbacks of prior art. Another aim was to provide methods that do not need complicated arrangements of optical elements and do not need materials the preparation of which requires a large number of process steps and unfavourable reaction conditions. Further aims of the invention are immediately evident to the skilled in the art from the following description.

The inventors have discovered that 3-dimensional effects can be obtained without the use of flaked LC pigment materials. Two-stage printing or coating and UV curing of reactive CLC materials can be carried out at low temperatures below 60° C. or even at RT (room temperature) as described below to form the two different perspective images required for 3-D imaging. This does not require the formation of variable-pitch LC flakes and can be viewed with standard circular polariser devices, provided that each eye sees the image through only one of the circular polarisers.

Furthermore, the inventors have found that complicated images of CLC flakes are not required to provide a perception of depth in an image. By utilising both enantiomeric forms of CLC materials in a printed/coated design an impression of depth is obtained, even when the two enantiomeric forms are printed into different regions or form different images, when viewed through a viewing device comprising two circular polarisers, provided that the handedness of each polariser is different and that each eye can only see the image through one of the polarisers. The circular polarisers necessary for this viewing device need not be manufactured from similar liquid crystalline materials but standard circular polarisers may be used.

This effect can be seen from a distance of several meters (for example, up to at least 1 meter, preferably up to at least 2 meters, especially to at least 5 meters) and, when combined with other properties of CLC materials such as angular colour dependency and thermochromism, imparts an additional security feature. An advantage of this kind of device as a security feature is that the effect is destroyed if the feature is covered with material such as adhesive tape or clear polymer films since it disturbs the polarisation state of the light.

Both these processes are described in more detail below.

The invention relates to a method of generating a 3-dimensional effect by providing at least one first and at least one second image layer of a chiral liquid crystal material, wherein one of said first and second image layers reflects right-handed circularly polarised light and the other reflects left-handed circularly polarised light, characterized in that said first and second image layers comprise polymerised or crosslinked cholesteric liquid crystal (CLC) material and are obtained by providing a polymerisable CLC material on a substrate, aligning said material into planar orientation and polymerising said material in its liquid crystal state at a temperature below 60° C., and/or the first and second images are not directly superimposed onto each other and/or do not form a stereo pair of images.

The invention further relates to an apparatus for generating a 3-dimensional effect comprising at least one first and at least one second image layer as described above and below.

The invention further relates to a 3-dimensional image generated by a method or an apparatus as described above and below.

The invention further relates to the use of a method, apparatus or image as described above and below for decorative or security applications.

The invention further relates to a security or verification marking or device comprising an apparatus or image as described above and below.

The invention further relates to a security device comprising a printed area containing both enantiomeric forms of a chiral liquid crystal material that can be verified from large distances (for example, up to at least 1 meter, preferably upto at least 2 meters, especially to at least 5 meters) by viewing through a device made from two circular polarisers, one of which is left handed and the other is right handed.

The invention further relates to a document of value comprising a security or verification marking or device as described above and below.

DETAILED DESCRIPTION OF THE INVENTION

A first preferred embodiment of the present invention relates to a method of generating a 3-dimensional effect by providing at least one first and at least one second image layer of a chiral liquid crystal material, wherein one of said first and second image layers reflects right-handed circularly polarised light and the other reflects left-handed circularly polarised light, characterized in that said first and second image layers comprise polymerised or crosslinked CLC material, and are obtained by providing a polymerisable CLC material on a substrate, aligning it into planar orientation and polymerising it in its liquid crystal state at temperatures below 60° C.

By utilising this method, a 3-dimensional effect can easily be obtained without the use of flaked LC pigment materials or complicated manufacturing or assembling techniques. The images can be provided by two-stage printing or coating and UV curing of a reactive chiral LC materials to form the two different perspective images required for 3-D imaging.

The image can be viewed with standard circular polariser devices, provided that each eye sees the image through only one of the circular polarisers.

Especially suitable materials are polymerisable CLC mixtures comprising one or more achiral polymerisable mesogenic compounds and one or more polymerisable or non-reactive chiral mesogenic dopants. Suitable and preferred polymerisable CLC mixtures are disclosed, for example, in EP 1 134 596 A,;GB 2 357 291 A, GB 2 315 760 A, U.S. Pat. No. 6,117,920 and EP 0 880 570 A, the entire disclosures of which are incorporated into this application by reference. The process of coating, aligning and polymerising the polymerisable CLC material to form the image layers can be carried out by standard techniques which are known in the art and is also described in the above mentioned documents.

Especially preferred variants of said first preferred embodiment are the following the polymerisable CLC material comprises at least one achiral polymerisable mesogenic compound and at least one chiral compound which may in addition be polymerisable and/or mesogenic.

the CLC material is polymerised at a temperature from 30 to 50° C., preferably at a temperature from 30 to 40° C., in particular from 30 to 35° C.

the CLC material is polymerised at a temperature from 10 to 30° C., preferably at room temperature.

said first and second image layers are obtainable by coating or printing a layer of polymerisable CLC material onto the same side or onto opposite sides of a substrate, orienting the material, polymerising the material and optionally removing the substrate from the polymerised layers.

said first and second image layers reflect circularly polarised light of different wavelengths.

said first image layer is provided on a substrate and optionally covered by an intermediate layer, and said second image layer is provided on top of said first image layer (or, if present, on top of said intermediate layer).

said substrate comprises a light absorbing material.

at least one quarter wave retardation layer is provided on top of said first or second image, in this case the images are best observed through a linear polariser.

The intermediate layer can be for example a second substarte. Suitabl substarte materials are disclosed in, for example, in EP 1 134 596 A, GB 2 357 291 A, GB 2 315 760 A, U.S. Pat. No. 6,117,920 and EP 0 880 570 A.

A second preferred embodiment of the present invention relates to a method of generating a 3-dimensional effect by providing at least one first and at least one second image layer of a chiral liquid crystal material, wherein one of said first and second image layers reflects right-handed circularly polarised light and the other reflects left-handed circularly polarised light, characterized in that the first and second images are not directly superimposed onto each other and/or do not form a stereo pair of identical images.

Especially preferred is a method as described above wherein the first and second images are not directly superimposed onto each other and do not form a stereo pair of images.

The inventors have found that complicated images of CLC-materials are not required to provide a perception of depth in an image. By utilising both enantiomeric forms of CLC materials in a printed/coated design an impression of depth is obtained, even when the two enantiomeric forms are printed into different regions or form different images, when viewed through a viewing device comprising two circular polarisers, provided that the handedness of each polariser is different and that each eye can only see the image through one of the polarisers. The circular polarisers necessary for this viewing device need not be manufactured from similar liquid crystalline materials but standard circular polarisers may be used.

This effect can be seen from a distance of several meters (for example, up to at least 1 meter, preferably upto at least 2 meters, especially to at least 5 meters) and when combined with other properties of CLC materials such as angular colour dependency and thermochromism imparts an additional security feature. An advantage of this kind of device as a security feature is that the effect is destroyed if the feature is covered with material such as adhesive tape or clear polymer films since it disturbs the polarisation state of the light.

The CLC materials of the first and second layer are preferably made of similar materials having opposite enantiomeric forms. However, the first and second layers can also be made from different CLC material, e.g., having different reflective wavelengths, having different enantiomeric forms.

The CLC materials can be applied by conventional printing and coating processes. It is possible to use pure CLC materials, encapsulated CLCs, solutions of CLCs in a solvent or polymerised or crosslinked CLC materials like those described in the first preferred embodiment above.

Especially preferred are encapsulated CLC materials. Especially suitable are thermochromic CLC mixtures like for example those disclosed in GB 2 355 987 and GB 2 280 681. However, generally any chiral LC materials can be used provided that similar mixtures can be prepared with both chiralities of material. Suitable encapsulation methods and materials are known in the art and are also described in the above mentioned documents.

Further preferred are polymerised CLC materials. For example, suitable polymerisable CLC materials are disclosed in EP 1 134 596 A, GB 2 357 291 A, GB 2 315 760 A, U.S. Pat. No. 6,117,920 and EP 0 880 570 A, the entire disclosure of which is incorporated into this application by reference. These materials can be aligned and polymerised to form polymerised CLC image layers by standard techniques that are known in the art and are also described in the above documents.

Especially preferred variants of said second preferred embodiment are the following
  said first and second image layers comprise are obtained from a polymerisable CLC material comprising at least one achiral polymerisable mesogenic compound and at least one chiral compound which may in addition be polymerisable and/or mesogenic
  said first and second image layers are obtainable by coating or printing a layer of polymerisable CLC material onto a substrate, orienting the material, polymerising the material and optionally removing the substrate from the polymerised layers.
  said first and second image layers reflect circularly polarised light of different wavelengths.
  said substrate comprises a light absorbing material.
  at least one quarter wave retardation layer is provided on top of said first or second image, in this case the images are best observed through a linear polariser.

The preferred variants listed above for the first preferred embodiment are also preferred variants for the second preferred embodiment, and the preferred variants listed above for the second preferred embodiment are also preferred variants for the first preferred embodiment.

The polymerisable CLC material preferably comprises at least one monoreactive polymerisable mesogenic compound and at least one di- or multireactive polymerisable mesogenic compound.

Polymerisable mesogenic mono-, di- and multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397, EP 0 261 712, DE 195 04 224, WO 95/22586 and WO 97/00600. The compounds disclosed in these documents, however, are to be regarded merely as examples that do not limit the scope of this invention.

Examples representing especially useful mono- and direactive polymerisable mesogenic compounds are shown in the following list of compounds, which should, however, be taken only as illustrative and is in no way intended to restrict, but instead to explain the present invention:

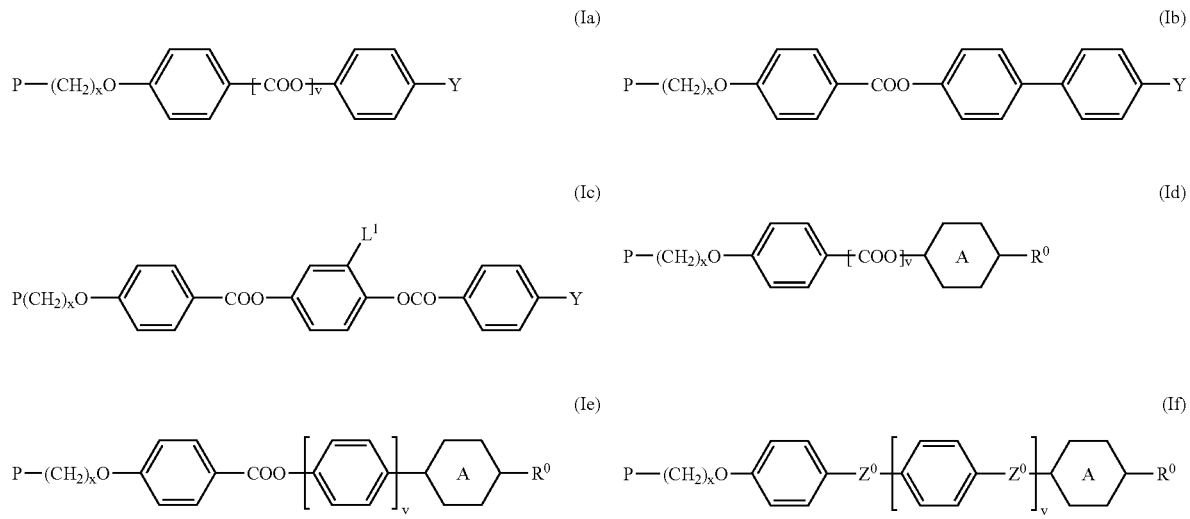

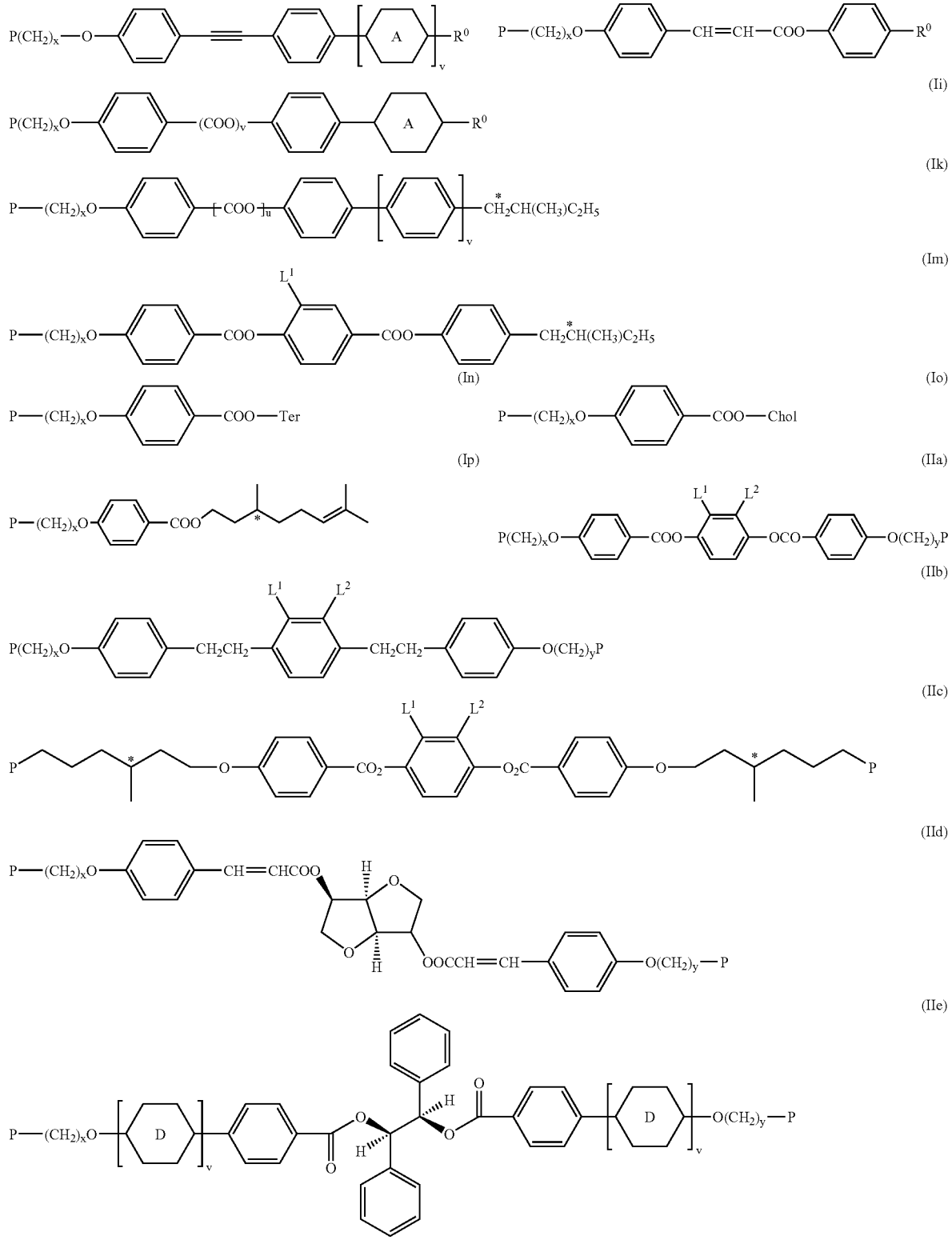
In the above formulae, P is a polymerisable group, preferably an acryl, methacryl, vinyl, vinyloxy, propenyl ether, epoxy or styrene group, x and y are each independently 1 to 12, A and D are each independently a 1,4-phenylene that is optionally mono-, di- or trisubstituted by $L^1$ or 1,4-cyclohexylene, u and v are each independently 0 or 1, $Z^0$ is —COO—, —OCO—, —CH$_2$CH$_2$— or a single bond, Y is a polar group, R$^0$ is an unpolar alkyl or alkoxy group, Ter is a terpenoid radical like, e.g., menthyl, Chol is a cholesteryl group, and L$^1$ and L$^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono-, oligo-, or polyfluorinated alkyl or alkoxy group with 1 to 4 C atoms. The term 'unpolar group' means an alkyl group with 1 or more, preferably 1 to 12 C atoms or an alkoxy group with 2 or more, preferably 2 to 12 C atoms.

The polymerisable LC material preferably comprises one or more mono-, di- or multireactive achiral polymerisable mesogenic compounds and one or more chiral compounds which are optionally polymerisable and/or mesogenic.

A preferred polymerisable CLC material comprises
a) one or more direactive achiral and/or direactive chiral mesogenic compounds, and
b) one or more monoreactive achiral and/or monoreactive chiral mesogenic compounds,
wherein at least one of components a) and b) comprises a chiral compound.

Another preferred polymerisable CLC material comprises
a) one or more direactive achiral mesogenic compounds,
b) one or more monoreactive achiral mesogenic compounds, and
c) one or more non-polymerisable chiral compounds.

Another preferred polymerisable CLC material comprises no di- or multireactive ompounds of component a), and essentially consists of monoreactive compounds of component b) and optionally nonpolymerisable compounds of component c).

Another preferred polymerisable CLC material comprises
a) 0–70%, preferably 1–50%, very preferably 1–40% of above component a), and
b) 30–95% preferably 50–75% of above component b).

Another preferred polymerisable CLC material comprises
a) 0–70%, preferably 1–50%, very preferably 1–40% of above component a),
b) 30–95% preferably 50–75% of above component b), and
c) 0,1–15%, preferably 0,5–10%, very preferably 1–5% of above component c).

The monoreactive achiral compounds are preferably selected from above formulae Ia-Ig and Ii, in particular Ia, Ie and Ig, wherein v is 1. The direactive achiral compounds are preferably selected from above formulae IIa and IIb, in particular IIa.

The non-polymerisable chiral compounds can be selected from conventional chiral dopants.

Suitable chiral dopants are selected, e.g., from the commercially available cholesteryl nonanoate (CN), CB15, R/S-811, R/S-1011, R/S-2011, R/S-3011 or R/S-4011 (Merck KGaA, Darmstadt). Particularly suitable are dopants with high twisting power comprising a chiral sugar group, in particular dianhydrohexitol derivatives like for example derivatives of sorbitol, mannitol or iditol, very preferably sorbitol derivatives as disclosed in WO 98/00428. Further preferred are dopants comprising a hydrobenzoin group as described in GB 2,328,207, chiral binaphthyl derivatives as described in WO 02/94805, chiral binaphthol acetal derivatives as described in WO 02/34739, chiral TADDOL derivatives as described in WO 02/06265, and chiral dopants with at least one fluorinated linkage group and a terminal or central chiral group as described in WO 02/06196 and WO 02/06195.

Another object of the invention is an apparatus for generating a 3-dimensional effect comprising at least one first and at least one second image layer as described above and below.

Especially preferred is an apparatus that further comprises a means of detecting the 3-dimensional effect comprising a pair of films, foils, lenses or glasses, one of which transmits the right-handed circularly polarized light and the other transmits the left-handed polarized light reflected by said first and second image layers.

The method, apparatus and image as described above and below are preferably used for decorative or security applications. Thus, another object of the invention is a security or verification marking, device or thread comprising an apparatus or image as described above and below.

The security marking can be used for direct application, e.g., onto an article, device or document, or as threads, holograms or hot stamping foils for decorative or security applications, to authenticate and prevent counterfeiting of documents of value, for identification of hidden images, informations or patterns. It can be applied to consumer products or household objects, car bodies, foils, packing materials, clothes or woven fabric, incorporated into plastic, or applied as security markings or threads on documents of value like banknotes, credit cards or ID cards, national ID documents, licenses or any product with money value, like stamps, tickets, shares, cheques etc.

Without further elaboration, it is believed that one skilled in the art can, using the preceding description, utilise the present invention to ist fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

The entire disclosure of all applications, patents and publications, cited above and below, and of corresponding European Application No. 02015207.0, filed Jul. 9, 2003, is hereby incorporated by reference.

BRIEF DESCRIPTION OF THE DRAWINGS

FIG. 1 illustrates the mixture of Example 1 when viewed through a left handed circular polariser the image.

FIG. 2 illustrates the mixture of Example 1 when viewed through a RHCP.

FIG. 3 illustrates the mixtures of Example 2 encapsulated, formed into an ink system, and printed by screen printing techniques to produce the design as schematically depicted.

EXAMPLES

Example 1

3-D Imaging Process Utilising Polymerised Liquid Crystal Material

A polymerisable liquid crystal mixture was prepared as follows:

| | |
|---|---|
| Compound (A) | 10.24% |
| Compound (B) | 8.18% |
| Compound (C) | 1.58% |
| Compound (D) | 9.92% |
| Irgacure 369 | 2.62% |
| Fluorad FC 171 | 0.12% |
| Xylene | 67.34% |

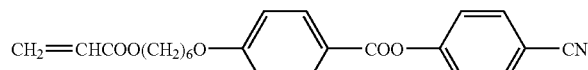

(A)

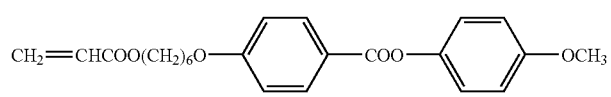

(B)

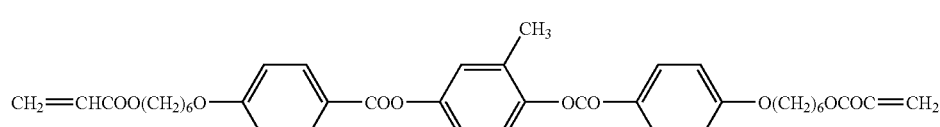

(C)

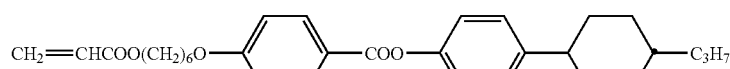

(D)

Compounds (A), (B) and (C) can be prepared according to or in analogy to the methods described in D. J. Broer et al., Makromol. Chem. 190, 3201–3215 (1989). Compound (D) and its preparation are described in GB 2,280,445. Irgacure 369 is a commercially available photoinitiator (Ciba Geigy). Fluorad FC 171 is a commercially available surfactant (3M Inc.).

This mixture was split into two equal parts and the chiral compound (E1) and (E2), respectively, was added in an amount of 5% by weight of the total amount of solid components, to impart the required reflected colour properties. This yielded Mixture 1 and 2 as described below:

Mixture 1: Host + Compound (E1) (5% by weight of total solids)
Mixture 2: Host + Compound (E2) (5% by weight of total solids)

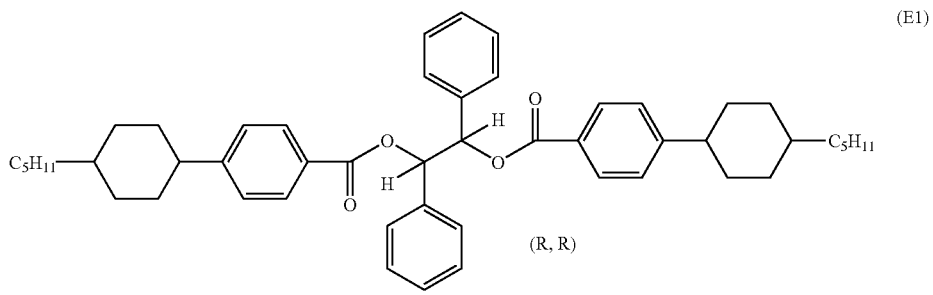

(E1)

(R, R)

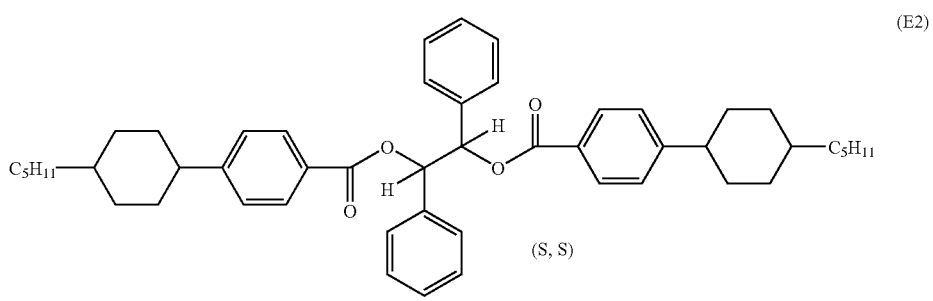

(E2)

(S, S)

The preparation of (E1) and (E2) is described in GB 2,328,207.

The solution of Mixture 1 in xylene was coated onto a 30 micron thick TAC (Triacetylcellulose) film. The coating was exposed to UV radiation at a temperature of 30–35° C. through a mask. This had the effect of fixing the colour in the areas that were exposed to the UV radiation. The uncured material was washed off using isopropanol.

The solution of Mixture 2 in xylene was then coated onto the reverse side of the TAC film. The mixture was allowed to align and then cured as described above through a different mask. Again the uncured material was washed off using isopropanol.

When viewed through a left handed circular polariser the image depicted in FIG. 1 is seen and when viewed through a RHCP the image depicted in FIG. 2 is seen. If a viewer is prepared such that the LHCP covers the left eye and a RHCP covers the right eye a perceived depth appears to the printed image. This effect is discernible from a relatively large distance.

Alternatively, the coatings could be prepared by sequential coating onto a single film, preferably a black film to absorb light.

Alternatively, the two images may be sequentially printed, with a curing process to fix the first image before the second image is applied.

Example 2

Perceived Depth Process

A nematic liquid crystal host mixture is prepared as below.

Chiral dopants are added to this host to prepare two mixtures that have the same reflection colour and differ only in their chirality.

| HOST | 87.09% | HOST | 87.09% |
| S811 | 2.77% | R811 | 2.77% |
| S2011 | 5.23% | R2011 | 5.23% |
| E1 | 4.91% | E2 | 4.91% |

R/S-811 and R/S-2011 are commercially available chiral dopants (from Merck KGaA, Darmstadt, Germany).

These mixtures are then encapsulated and the capsules formed into an ink system. The inks are printed by screen printing techniques to produce the design as schematically depicted in FIG. 3, wherein the "R" is printed in the opposite chirality from the other letters.

When viewed through a viewing device comprising a left handed and a right handed circular polariser, such that each eye only sees the image through one polariser a perceived depth is seen in the image. The "R" seems to have be at another distance than the remaining letters. This effect can be seen from a distance of several meters (for example, up to at least 1 meter, preferably upto at least 2 meters, especially to at least 5 meters).

| Material | % |
|---|---|
| $C_5H_{11}$—⬡—⬡—COO—⬡—$C_3H_7$ | 8.01% |
| $C_3H_7$—⬡—⬡—COO—⬡—$C_3H_7$ | 3.43% |
| $C_8H_{17}$—⬡—COO—⬡—$OC_5H_{11}$ | 14.85% |
| $C_6H_{13}$—⬡—COO—⬡—$OC_5H_{11}$ | 14.86% |
| $C_3H_7$—⬡—COO—⬡—$C_5H_{11}$ | 11.44% |
| $C_5H_{11}$—⬡—COO—⬡—$C_5H_{11}$ | 29.13% |
| $C_5H_{11}$—⬡(F)—⬡—$C_2H_4$—⬡—Cl | 13.72% |
| $C_5H_{11}$—⬡—⬡—⬡—⬡—$C_5H_{11}$ | 2.28% |
| $C_5H_{11}$—⬡—⬡—⬡—⬡—$C_3H_7$ | 2.28% |

Both the above examples can be modified by the inclusion of a quarter-wave retardation layer. This allows the effects to be seen through a device containing linear polarisers. Effectively the circular polariser comprises a quarter-wave layer and a linear polariser, the relative distance between these two layers is not important.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of generating a 3-dimensional effect comprising:
   providing at least one first image layer of a chiral liquid crystal material, and at least one second image layer of a chiral liquid crystal material, wherein one of said first and second image layers reflects right-handed circularly polarised light and the other reflects left-handed circularly polarised light, and wherein
   (a) said first and second image layers each comprise polymerised or crosslinked cholesteric liquid crystal material and are obtained by providing a polymerisable chiral liquid crystal material on a substrate, aligning said material into planar orientation and polymerising said material in its liquid crystal state at a temperature below 60° C., or
   (b) said first and second image layers are not directly superimposed onto each other and do not form a stereo pair of images, or
   (c) said first and second image layers each comprise polymerised or crosslinked cholesteric liciuid crystal material and are obtained by providing a polymerisable chiral liquid crystal material on a substrate, aligning said material into planar orientation and polymerising said material in its liciuid crystal state at a temperature below 60° C., and said first and second image layers are not directly superimposed onto each other and do not form a stereo pair of images.

2. A method according to claim 1, wherein said first and second image layers each comprise polymerised or crosslinked cholesteric liquid crystal material and are obtained by providing a polymerisable chiral liquid crystal material on a substrate, aligning said material into planar orientation and polymerising said material in its liquid crystal state at a temperature below 60° C.

3. A method according to claim 2, wherein said first and second image layers are obtainable by coating or printing a layer of polymerisable chiral liquid crystal material onto the same side or onto opposite sides of a substrate, orienting the material, polymerising the material and optionally removing the substrate from the polymerised layers.

4. A method according to claim 2, wherein the polymerisable chiral liquid crystal material comprises at least one achiral polymerisable mesogenic compound and at least one chiral compound which, optionally, is polymerisable, mesogenic, or both.

5. A method according to claim 4, wherein said first and second image layers are obtainable by coating or printing a layer of polymerisable chiral liquid crystal material onto the same side or onto opposite sides of a substrate, orienting the material, polymerising the material and optionally removing the substrate from the polymerised layers.

6. A method according to claim 1, wherein said first and second image layers comprise encapsulated cholesteric liquid crystal material.

7. A method according to claim 1, wherein said first and second image layers comprise polymerised cholesteric liquid crystal material.

8. A method according to claim 1, wherein said first and second image layers reflect circularly polarised light of different wavelengths.

9. A method according to claim 1, wherein said first image layer is provided on a substrate and optionally covered by an intermediate layer, and said second image layer is provided on top of said first image layer.

10. A method according to claim 9, wherein said substrate comprises a light absorbing material.

11. An apparatus for generating a 3-dimensional effect comprising at least one first image layer of a chiral liquid crystal material and at least one second image layer of a chiral liciuid crystal material, wherein one of said first and second image layers reflects right-handed circularly polarised light and the other reflects left-handed circularly polarised light, and wherein
   (a) said first and second image layers each comprise polymerised or crosslinked cholesteric liquid crystal material and are obtained by providing a polymerisable chiral liquid crystal material on a substrate, aligning said material into planar orientation and polymerising said material in its liquid crystal state at a temperature below 60° C., or
   (b) said first and second image layers are not directly superimposed onto each other and do not form a stereo pair of images, or
   (c) said first and second image layers each comprise polymerised or crosslinked cholesteric liquid crystal material and are obtained by providing a polymerisable chiral liquid crystal material on a substrate, aligning said material into planar orientation and polymerising said material in its liquid crystal state at a temperature below 60° C., and said first and second image layers are not directly superimposed onto each other and do not form a stereo pair of images.

12. An apparatus according to claim 11, further comprising a means of detecting the 3-dimensional effect comprising a pair of films, foils, lenses or glasses, one of which transmits the right-handed circularly polarized light and the other transmits the left-handed polarized light reflected by said first and second image layers.

13. A security or verification marking or device comprising an apparatus according to claim 11.

14. A document of value comprising a security or verification marking or device according to claim 13.

15. A method according to claim 1, wherein said polymerisable chiral liquid crystal material comprises at least one monoreactive polymerisable mesogenic compound and at least one di- or multireactive polymerisable mesogenic compound.

16. A method according to claim 15, wherein said mono- and direactive polymerisable mesogenic compounds are selected from the following formula:

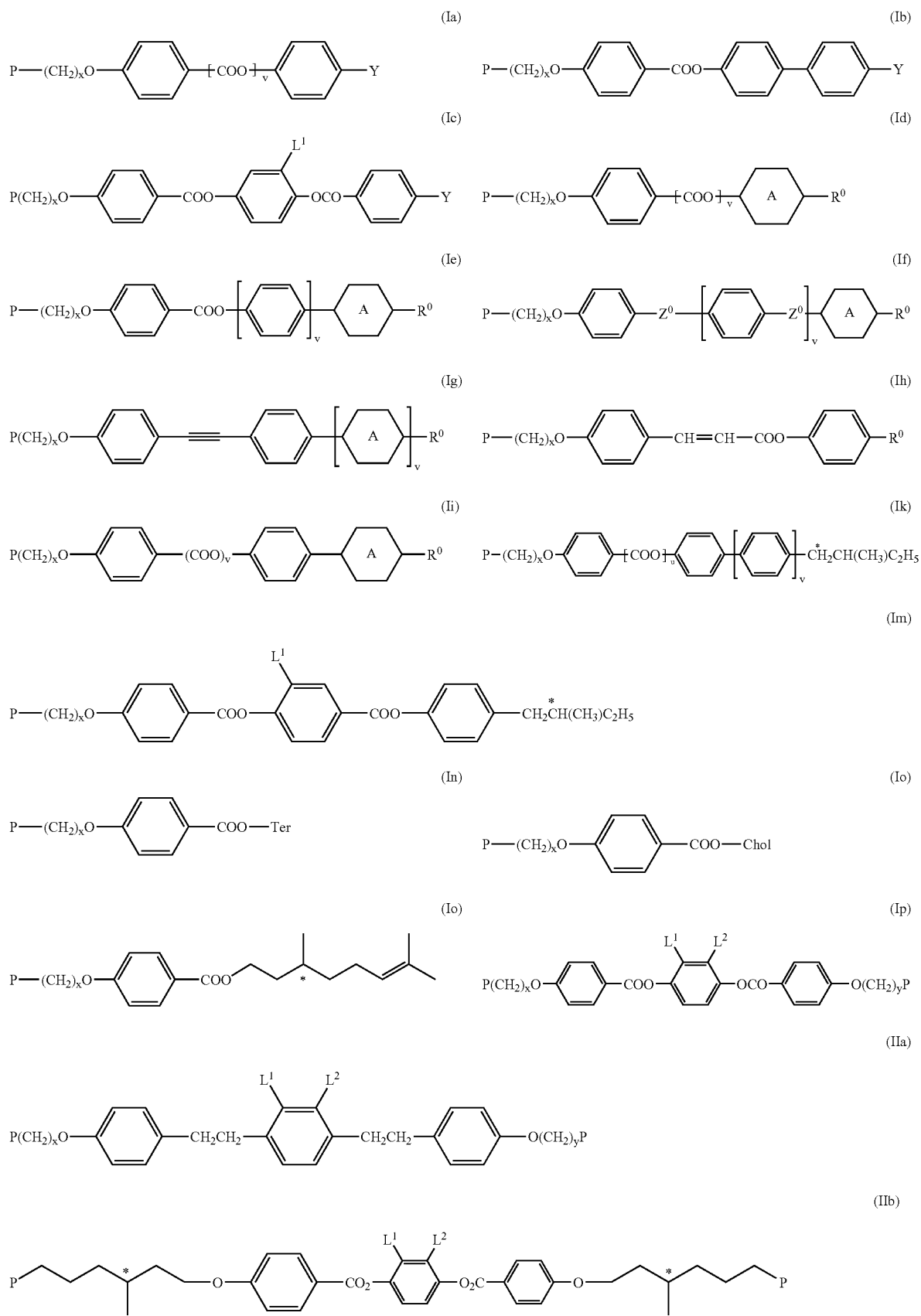

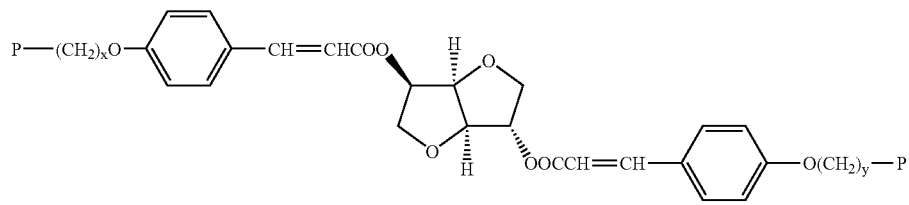

(IIc)

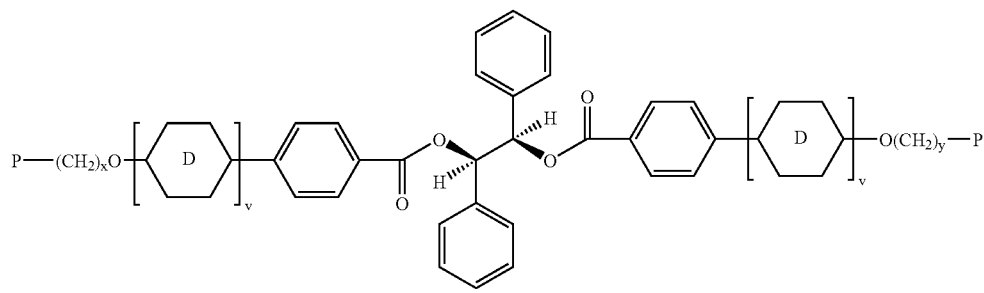

(IId)

wherein
P is a polymerisable group,
x and y are each independently 1 to 12,
A and D are each independently a 1,4-phenylene that is optionally mono-, di- or tri-substituted by $L^1$ or 1,4-cyclohexylene,
u and v are each independently 0 or 1,
$Z^0$ is —COO—, —OCO—, —CH$_2$CH$_2$— or a single bond,
Y is a group selected from F, Cl, CN, NO$_2$, OH, OCH$_3$, OCN, SCN, an optionally fluorinated carbonyl or carboxyl group with up to 4 C atoms or a mono-, oligo-, or polyfluorinated alkyl or alkoxy group with 1 to 4 C atoms,
$R^0$ is an unpolar alkyl with 1 to 12 C atoms or an alkoxy group with 2 to 12 C atoms,
Ter is a terpenoid radical,
Chol is a cholesteryl group, and
$L^1$ and $L^2$ are each independently H, F, Cl, CN, an optionally halogenated alkyl with 1 to 7 C atoms, an optionally halogenated alkoxy with up to 7 C atoms, an optionally halogenated alkylcarbonyl with up to 7 C atoms, an optionally halogenated alkoxycarbonyl with up to 7 C atoms or an optionally halogenated alkoxycarbonyloxy group with up to 7 C atoms.

17. A method according to claim 16, wherein said monoreactive achiral compounds are selected from formulae Ia–Ig and Ii, and said direactive achiral compounds are selected from formulae IIa and IIb.

18. A method according to claim 1, wherein said polymerisable chiral liquid crystal material comprises one or more mono-, di- or multireactive achiral polymerisable mesogenic compounds and one or more chiral compounds which are optionally polymerisable and/or mesogenic.

19. A method according to claim 1, wherein said polymerisable chiral liquid crystal material comprises
a) one or more direactive achiral and/or direactive chiral mesogenic compounds, and
b) one or more monoreactive achiral and/or monoreactive chiral mesogenic compounds,
wherein at least one of components a) and b) comprises a chiral compound.

20. A method according to claim 1, wherein said polymerisable chiral liquid crystal material comprises
a) one or more direactive achiral mesogenic compounds,
b) one or more monoreactive achiral mesogenic compounds, and
c) one or more non-polymerisable chiral compounds.

21. A method according to claim 1, wherein said polymerisable chiral liquid crystal material comprises no di- or multireactive achiral mesogenic compounds and essentially consists of monoreactive achiral mesogenic compounds and optionally contains non-polymerisable chiral compounds.

22. A method according to claim 1, wherein said polymerisable chiral liquid crystal material comprises 1–50% of di- or multireactive achiral mesogenic compounds, and 30–95% of monoreactive achiral mesogenic compounds.

23. A method according to claim 22, wherein said polymerisable chiral liquid crystal material further comprises 0.1–15% of non-polymerisable chiral compounds.

24. A method according to claim 1, wherein said polymerisable chiral liquid crystal material contains no more than 15% of non-polymerisable chiral compounds.

25. A 3-dimensional image generated by a method according to claim 1.

* * * * *

UNITED STATES PATENT AND TRADEMARK OFFICE
CERTIFICATE OF CORRECTION

| | |
|---|---|
| PATENT NO. | : 7,041,233 B2 |
| APPLICATION NO. | : 10/615376 |
| DATED | : May 9, 2006 |
| INVENTOR(S) | : Matthias Kuntz |

Page 1 of 1

It is certified that error appears in the above-identified patent and that said Letters Patent is hereby corrected as shown below:

Column 16, line 25 reads "liciuid" should read --liquid --
Column 19, line 34 reads "polymeri sable" should read --polymerisable --
Column 19, line 60 reads "ha" should read --lia --

Signed and Sealed this

Fifth Day of December, 2006

JON W. DUDAS
*Director of the United States Patent and Trademark Office*